(12) United States Patent
Van Dyck et al.

(10) Patent No.: US 6,303,171 B1
(45) Date of Patent: Oct. 16, 2001

(54) METHOD AND DEVICE FOR PRODUCING THIN PIECES OF CHOCOLATE

(76) Inventors: Jan Van Dyck, Toekomstlaan 4, B-2200 Herentals; Kris Van Dyck, Kasterleesesteenweg 77, B-2460 Lichtaart (Kasterlee), both of (BE)

( * ) Notice: Subject to any disclaimer, the term of this patent is extended or adjusted under 35 U.S.C. 154(b) by 0 days.

(21) Appl. No.: 09/689,733

(22) Filed: Oct. 13, 2000

(30) Foreign Application Priority Data

Jun. 14, 2000 (BE) ................................................ 2000/0382

(51) Int. Cl.[7] ................................ A23G 7/00; A23P 1/00
(52) U.S. Cl. ......................... 426/515; 425/446; 425/453; 426/660
(58) Field of Search ................................. 426/512, 515, 426/524, 660; 425/446, 453

(56) References Cited

U.S. PATENT DOCUMENTS

| 5,079,022 | * | 1/1992 | Jeanneret | 426/515 |
| 5,180,602 | * | 1/1993 | Bainbridge et al. | 426/515 |
| 5,395,229 |   | 3/1995 | Atwood | 426/499 |
| 6,001,403 |   | 12/1999 | Kobayashi | 426/512 |

FOREIGN PATENT DOCUMENTS

| 12095 | 3/1880 | (DE) . |
| 3034094 | 3/1982 | (DE) . |
| 374319 | 6/1989 | (DE) . |
| 4005934 | 8/1991 | (DE) . |
| 2577110 | 8/1986 | (FR) . |
| 2174036 | 10/1986 | (GB) . |

OTHER PUBLICATIONS

"Continuous cake mfg. device . . .", F. Masuda, XP–002162163 and JP 63 219332A, Sep. 1988, Database WPI, Section Ch, Week 198842, Derwent Publications Ltd., London, GB; Class D11, AN 1988–297694.

* cited by examiner

*Primary Examiner*—George C. Yeung
(74) *Attorney, Agent, or Firm*—Bacon & Thomas, PLLC

(57) ABSTRACT

The present invention concerns a method for producing thin pieces of chocolate, in particular slices of chocolate, whereby the chocolate is melted and is provided in the shape of flat, thin pieces of chocolate, which are put one after the other, on at least one endless, flexible conveyor belt of a conveying device, whereby the conveyor belt is subsequently bent crosswise so that it forms a trough before the pieces have stiffened, and the conveyor belt is kept in this bent position until the pieces lying in the trough and which are bent along with the conveyor belt have sufficiently stiffened so as to keep their bent shape.

9 Claims, 2 Drawing Sheets

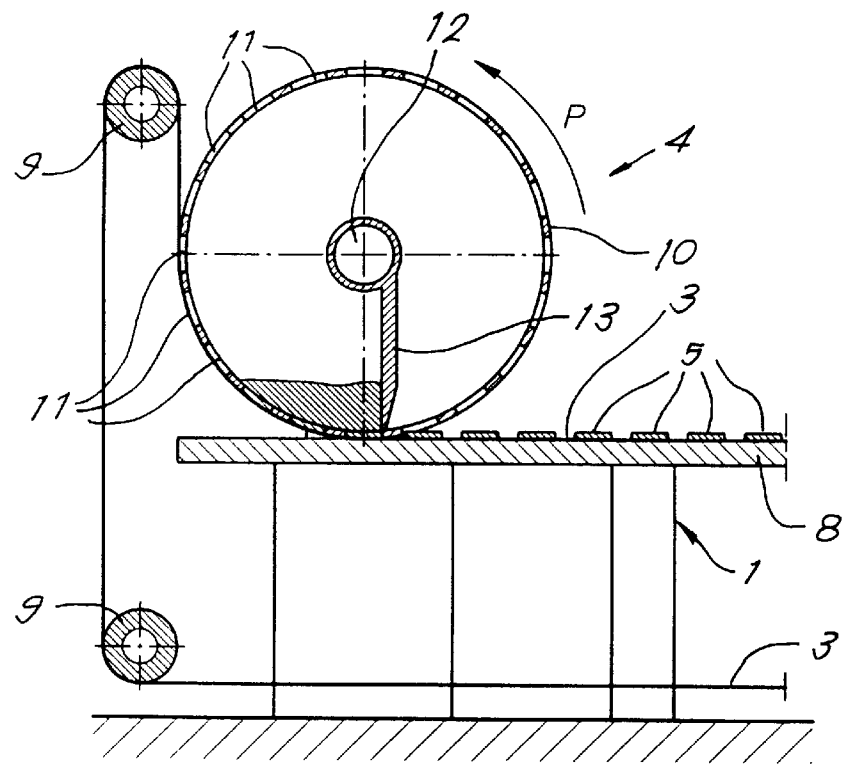
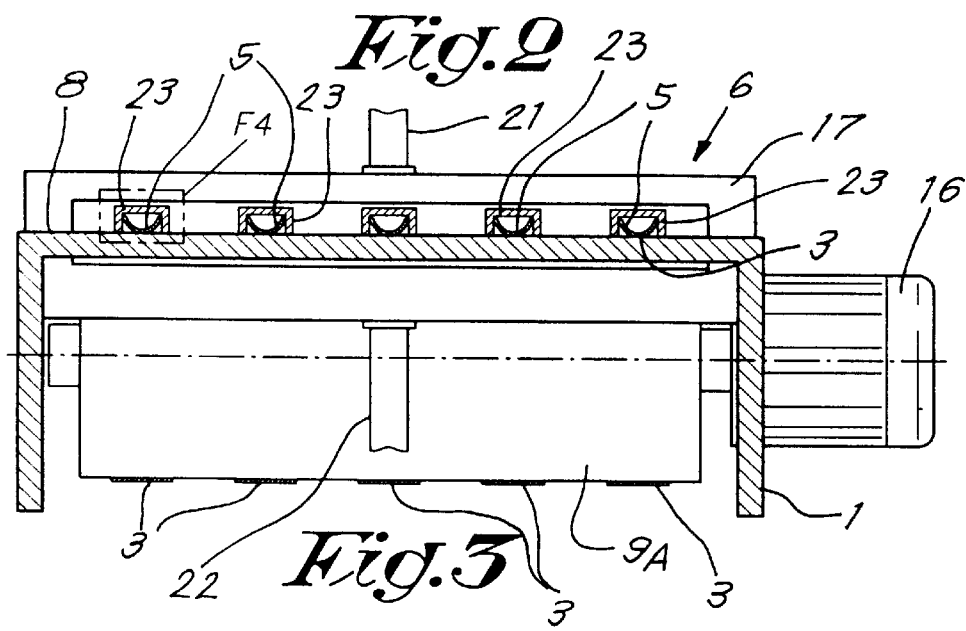
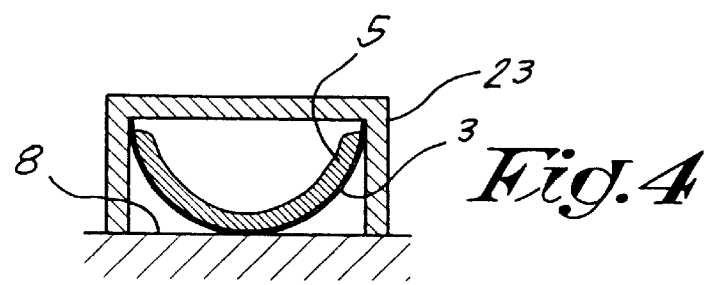

METHOD AND DEVICE FOR PRODUCING THIN PIECES OF CHOCOLATE

BACKGROUND OF THE INVENTION

1. Field of the Invention

The present invention concerns a method for producing thin pieces of chocolate, in particular slices of chocolate, whereby the chocolate is melted and is provided in the shape of flat, thin pieces on a conveying device and is made to stiffen thereupon.

"Chocolate" is understood here in the broadest sense. Both bitter chocolate and milk chocolate or even white chocolate and so-called fantasy chocolate are included.

2. Discussion of the Related Art

According to a known method, chocolate is melted, provided on an endless conveyor belt in the shape of thin slices and finally cooled down until the slices have stiffened.

It is clear that, as the slices are provided on a conveyor belt, they will have a flat side after they-have stiffened and will have a flat look as a whole.

Nowadays, however, many snacks and such are made in eye-catching shapes, and it is interesting from a commercial point of view to this with chocolate as well.

It is not possible, however, to apply the same methods to chocolate as are used for snacks, which are baked.

One possibility of giving the thin pieces of chocolate a special shape would consist of shaping the pieces manually one after the other, right before they have completely stiffened.

It is clear that such a method is very labour-intensive and is not suitable for industrial production.

Another method consists in using moulds and shaping the thin pieces of chocolate in an analogous manner as the chocolate coverings of pralines, but this also is time-consuming.

Leading the slices over a cylinder provided with grooves is not feasible, as it is not possible in the case of chocolate to precisely determine the exact transition from deformable to sufficiently stiff, and the slices would moreover stick to the cylinder.

SUMMARY OF THE INVENTION

The invention aims a method for producing a thin piece of chocolate which does not have said disadvantages and which makes it possible to produce the piece in a nonflat shape in a fast and simple manner.

This aim is reached according to the invention in that the flat, thin pieces of chocolate are put one after the other on at least one endless, flexible conveyor belt of the conveying device, whereby said conveyor belt is subsequently bent crosswise so that it forms a trough before the pieces have stiffened, and the conveyor belt is kept in this bent position until the pieces lying in said trough and which are bent along with the conveyor belt have sufficiently stiffened so as to keep their bent shape.

The thus obtained pieces of chocolate are bent. They can have any shape whatsoever, but usually they are round.

The invention also concerns a device which is particularly suitable for applying the method according to the invention.

The invention thus concerns a device for producing thin pieces of chocolate, characterized in that it contains at least one endless, flexible conveyor belt, means for driving this conveyor belt, a distributing mechanism for forming thin pieces of chocolate from melted chocolate and for putting these one after the other on the above-mentioned conveyor belt, and a bending device to force the conveyor belt to bend crosswise.

The bending device may include a trough which is directed with its opening towards the conveyor belt, and which is preferably erected above the conveyor belt.

BRIEF DESCRIPTION OF THE DRAWINGS

In order to better explain the characteristics of the invention, the following preferred embodiment of a method and device for producing thin pieces of chocolate according to the invention are described as an example only without being limitative in any way, with reference to the accompanying drawings, in which:

FIG. 2 represents a section according to line II—II in FIG. 1 to a larger scale;

FIG. 3 represents a section according to line III—III in FIG. 1;

FIG. 4 represents the part which is indicated by F4 in FIG. 3 to a larger scale.

DESCRIPTION OF THE PREFERRED EMBODIMENT

Figure 1:
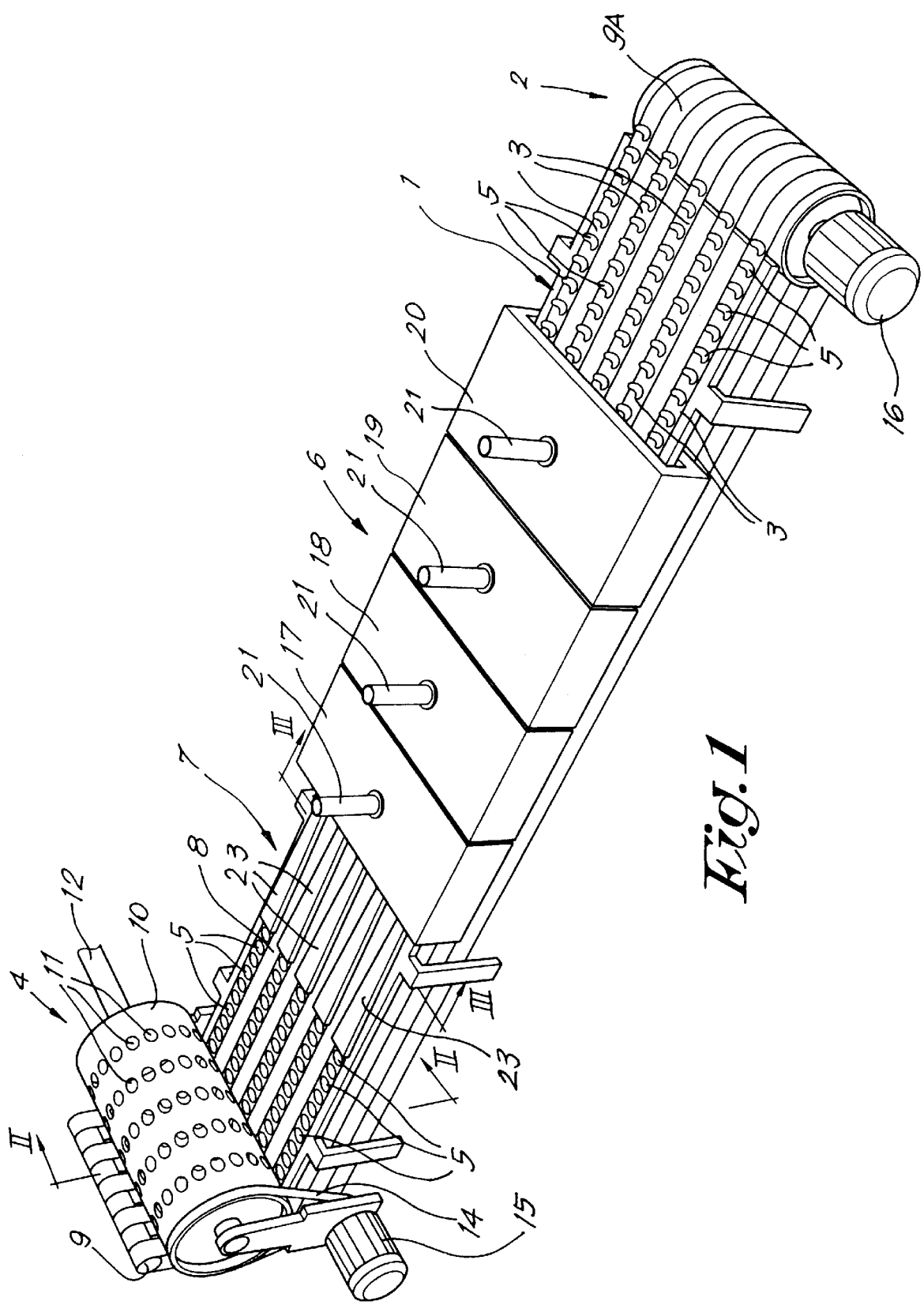
FIG. 1 represents a view in perspective of a device for producing thin pieces of chocolate according to the invention.

The device as represented in FIG. 1 mainly consists of a frame 1, an endless conveyor device 2 provided thereupon with a number of individual conveyor belts 3, a distributing mechanism 4 on one far end to provide chocolate in the shape of thin pieces, in particular slices 5, on the conveyor belts 3, a cooling tunnel 6 provided over a part of the conveyor device 2, and a bending device 7 above the conveyor belts 3 to bend them.

The frame 1 contains a longitudinal table 8, and the conveyor belts 3 are guided such, namely over cylinders 9, that one belt of the endless conveyor belts 3 is situated above the table 8 and the return belt is situated underneath it.

In the given example, the distributing mechanism 4 consists of a rotatable drum 10 which is closed at its far ends and which is directed with its axis across the conveyor belts 3, and which is provided with round, chocolate distributing openings 11 in its jacket. In an axially directed row are situated as many openings as there are conveyor belts 3. A first portion of the conveyor belts extends below the drum 10. Another portion of the conveyor belt upstream from the first portion extends around a portion of the drum 10.

A supply line is connected to the interior of the drum 10 and supplies hot air thereto. Also, provided within the drum 10 is a non-rotating scraping knife 13 located adjacent to an interior bottom section of the drum 10.

As is represented in detail in FIG. 2, one of the cylinders 9 is situated next to the top half of the drum 10, so that the conveyor belts 3 are guided against the lower part of the drum 10, and are moved further between the bottom side of said drum 10 and the table 8, over the top side of said table 8.

The drum 10 is driven by a drive 14 with a driving motor 15.

As the conveyor belts 3 connect to the drum 10 over a certain distance, they can be driven by means of said drum 10.

According to a variant, however, the conveyor belts 3 may have their own drive, which for example consists of a cylinder 9A on the far end of the conveyor device 2 which is turned away from the drum 10, over which the conveyor belts 3 are guided and which are driven by a motor 16 as represented in FIG. 1.

The peripheral velocity of the drum 10 and the linear speed of the conveyor belts 3 must be practically equal.

These conveyor belts 3 are flexible belts made of textile which is coated on the side upon which the chocolate is provided with a synthetic material for edible products such as for example polyethylene.

The cooling tunnel 6 is divided in four cooling zones 17, 18, 19 and 20 which each have their own inlet 21 and outlet 22 for cooling air.

Above each conveyor belt 3, the bending device 7 includes opposed fixed wall elements extending parallel to the conveyor belt 3 forming a stationary trough 23 in the shape of an inverse U made of metal, in particular stainless steel. The trough 23 engages opposed side edges of the conveyor belt 3 so as to urge the conveyor belt 3 to bend crosswise into a U-shaped, bent position.

The trough 23 extends in the longitudinal direction of the part of the endless conveyor belt 3 which is situated above the table 8, through the cooling tunnel 6, as represented in FIG. 1.

The front end of the trough 23, situated on the side of the drum 10, widens in a funnel-shaped manner towards the front, such that it meshes over the conveyor belt 3 while it is still flat and moving over the table 8.

With its side walls, the trough 23 is connected to the table 8, as represented in FIGS. 2 and 3, although, in order to promote the cooling of the slices 5, these side walls can remain past the funnel-shaped front part at a distance from the table 8.

The drum 10 is driven in the direction which is indicated by the arrow P in FIG. 2.

On the backside of the scraping knife 13, in relation to said sense of rotation, there is chocolate which has been melted, as represented in FIG. 2.

Each time a row of openings 11 reaches the melted chocolate mass, the openings 11 of this row are filled with chocolate. On the outside, these openings 11 are sealed by the conveyor belts 3 until they go past the scraping knife 13, and the conveyor belts 3 are released from the drum 10 as they are moved in a straight line over the table 8.

The chocolate which is still soft and which is situated in the openings 11 hereby sticks to the conveyor belts 3, so that it is released from the drum 10.

The chocolate of an axial row of openings 11 is provided in the shape of slices 5 on the conveyor belts 3, one on each conveyor belt 3.

In this way, slices 5 are provided one after the other on each conveyor belt 3, which, just as the conveyor belt 3, are flat past the drum 10.

When a conveyor belt 3 reaches a trough 23, it is gradually forced to bend crosswise, so that it forms a trough, whereby the side edges of the conveyor belt 3 are caught in the corners between the bottom and the downward directed side walls of the trough 23.

As the conveyor belt 3 is being bent into a trough, the slices 5 situated upon it and which have not stiffened yet are bent along.

FIGS. 3 and 4 represent the conveyor belts 3 in their maximally bent positions.

These conveyor belts 3 are maintained in these positions by the troughs 23 until the slices 5 which have been bent along have cooled sufficiently, and thus have stiffened enough so as to keep their shape.

In the zones 17, 18, 19 and 20, the slices 5 are successively cooled with cooled air of 12° C., 8° C., 8° C. and again 12° C.

When the slices 5 leave the cooling tunnel 6, they have stiffened enough and the conveyor belts 3 are no longer bent by the bending device.

At the end of the conveyor device 2, the bent slices 5, which are now situated loosely on the conveyor belts 3, are collected.

It is clear that the slices 5, before or after they are bent, can replace a decoration. Thus, while the slices 5 are still soft, it is possible to put puffed rice, grated coconut and/or the like on them.

The thin pieces of chocolate must not necessarily be round slices 5. Depending on the shape of the openings 11 in the drum 10, they can also be oval, ring-shaped, showing a net structure or grate structure in the middle, etc.

The thin pieces of chocolate can also be shaped in other ways than as described by means of a drum 10. What is important is that the pieces are bent by means of a bending device 7.

The bending device 7 must not necessarily form a through 23. Other bending means are possible, such as two walls standing on the table 8, of which for example the far ends have edges which are turned towards one another.

The invention is by no means limited to the above-described embodiments represented in the accompanying drawings; on the contrary, such a method and device for producing thin pieces of chocolate can be made in all sorts of variants while still remaining within the scope of the invention.

We claim:

1. A device for forming thin pieces of chocolate comprising a conveyor device having at least one endless, flexible conveyor belt and a motor for driving said at least one conveyor belt, a distributing mechanism arranged to form unstiffened, thin pieces of chocolate from melted chocolate and place said thin pieces of chocolate one after the other onto a first portion of said at least one conveyor belt, and a bending device arranged to force the at least one conveyor belt to bend crosswise at a second portion thereof downstream from said first portion, whereby the thin pieces of chocolate will be bent before they have stiffened to form bent, thin pieces of chocolate after they have stiffened.

2. The device according to claim 1 wherein the bending device comprises opposed fixed side walls extending parallel to the at least one conveyor belt and engaging opposed side edges of said belt.

3. The device according to claim 2, wherein the wall elements are situated above the at least one conveyor belt.

4. The device according to claim 1, wherein the conveyor device includes several conveyor belts arranged parallel to one another, each of said several conveyor belts being individually bent by the bending device.

5. The device according to claim 1 further comprising a cooling tunnel at least partly downstream from said second portion.

6. The device according to claim 1, wherein the distributing mechanism includes a rotatable drum having a jacket provided with chocolate distributing openings and a non-rotating scraping knife provided within said drum adjacent an interior bottom section of said drum, a portion of said at least one conveyor belt upstream from said first portion extending around a portion of said drum and said first portion of said conveyor belt extending below said drum.

7. The device according to claim 2, wherein the opposed side walls are defined by a continuous trough having a bottom connecting the side walls.

8. The device according to claim 7 wherein the trough is located in an inverted position above the conveyor belt.

9. A method of forming pieces of chocolate having a bent shape along a conveyor belt including a flat portion, a transition portion that meshes with said flat portion at a downstream end thereof and progressively transitions a cross-section of said conveyor belt to impart a bent shape, and a bent portion following said transition portion that maintains the bent shaped cross-section of said conveyor belt, said method comprising the steps of:

depositing molten chocolate pieces along said flat portion of said conveyor belt;

transporting said chocolate pieces through said transition portion of said conveyor belt thereby imparting a bent shape to said chocolate pieces; and maintaining said conveyor belt in said bent position until said chocolate pieces are cooled.

\* \* \* \* \*